(12) United States Patent
Fries

(10) Patent No.: US 7,805,631 B2
(45) Date of Patent: Sep. 28, 2010

(54) BARE METAL RECOVERY FROM BACKUP MEDIA TO VIRTUAL MACHINE

(75) Inventor: Robert M. Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 11/743,917

(22) Filed: May 3, 2007

(65) Prior Publication Data

US 2008/0275924 A1 Nov. 6, 2008

(51) Int. Cl.
  *G06F 11/00* (2006.01)
(52) U.S. Cl. .......................................... 714/6
(58) Field of Classification Search ............... 714/6
  See application file for complete search history.

(56) References Cited

U.S. PATENT DOCUMENTS

| | | | | |
|---|---|---|---|---|
| 5,488,716 | A | 1/1996 | Schneider et al. | 395/182.08 |
| 6,728,746 | B1 * | 4/2004 | Murase et al. | 718/1 |
| 6,785,695 | B1 | 8/2004 | Hamilton, II et al. | 707/204 |
| 6,931,558 | B1 | 8/2005 | Jeffe et al. | 713/340 |
| 7,143,307 | B1 | 11/2006 | Witte et al. | 714/6 |
| 7,356,679 | B1 * | 4/2008 | Le et al. | 713/1 |
| 7,487,383 | B2 * | 2/2009 | Bensinger | 714/4 |
| 2004/0172574 | A1 * | 9/2004 | Wing et al. | 714/4 |
| 2005/0216788 | A1 | 9/2005 | Mani-Meitav et al. | 714/6 |
| 2006/0005189 | A1 | 1/2006 | Vega et al. | 718/1 |
| 2006/0085792 | A1 | 4/2006 | Traut | 718/100 |
| 2009/0055822 | A1 * | 2/2009 | Tolman et al. | 718/1 |
| 2009/0222496 | A1 * | 9/2009 | Liu et al. | 707/204 |

FOREIGN PATENT DOCUMENTS

WO  WO 2007/002398 A2  1/2007

OTHER PUBLICATIONS

Bonkenburg, T. et al., "LifeBoat-An Autonomic Backup and Restore Solution", *Lisa* XVIII, 2004, 159-170, http://www.usenix.org/events.
Sugano, A., "Enterprise Backup and Recovery for ESX Server", *Windows IT Pro*, http://www.vizioncore.com/WhitePapers, 6 pages.
"Acronis True Image 9.1 Enterprise Server", http://www.acronis.com/enterprise/products/ATIES, 3 pages, 2000-2007.
"Symantec LiveState™ Recovery 6.0", Restore Systems Anytime, from Anywhere, to Virtually any Device, Data Sheet: Backup and Recovery, http://eval.veritas.com, 4 pages.

* cited by examiner

*Primary Examiner*—Marc Duncan
(74) *Attorney, Agent, or Firm*—Woodcock Washburn LLP

(57) ABSTRACT

A legacy computer system receives a hard drive or other hardware failure. Rather than attempting to rebuild the computer system or recover selected data, which may require locating discontinued hardware or even software, a virtual machine image is created from a previously prepared backup image of the hard drive. The retrieved backup image is modified to create a virtual image that is bootable on a virtual machine. Thus, the original computer environment stored on the legacy system is now virtualized removing the need to repair or replace the failed hardware.

14 Claims, 3 Drawing Sheets

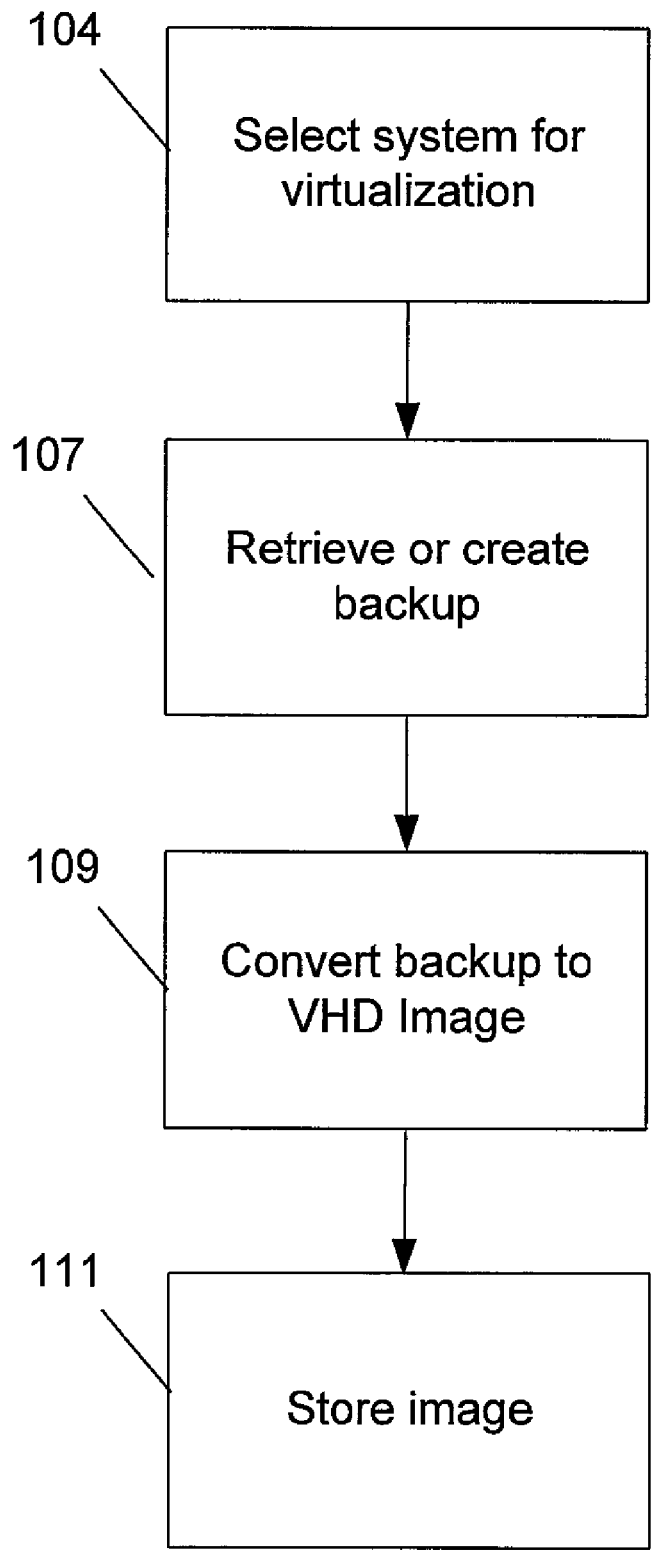

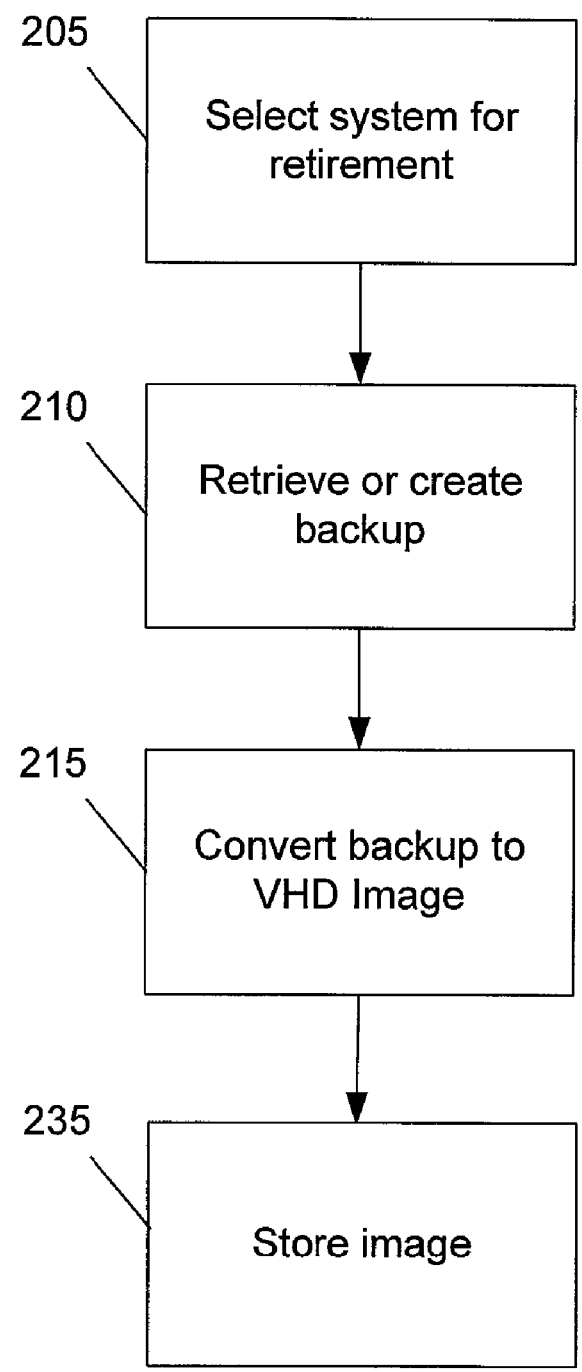

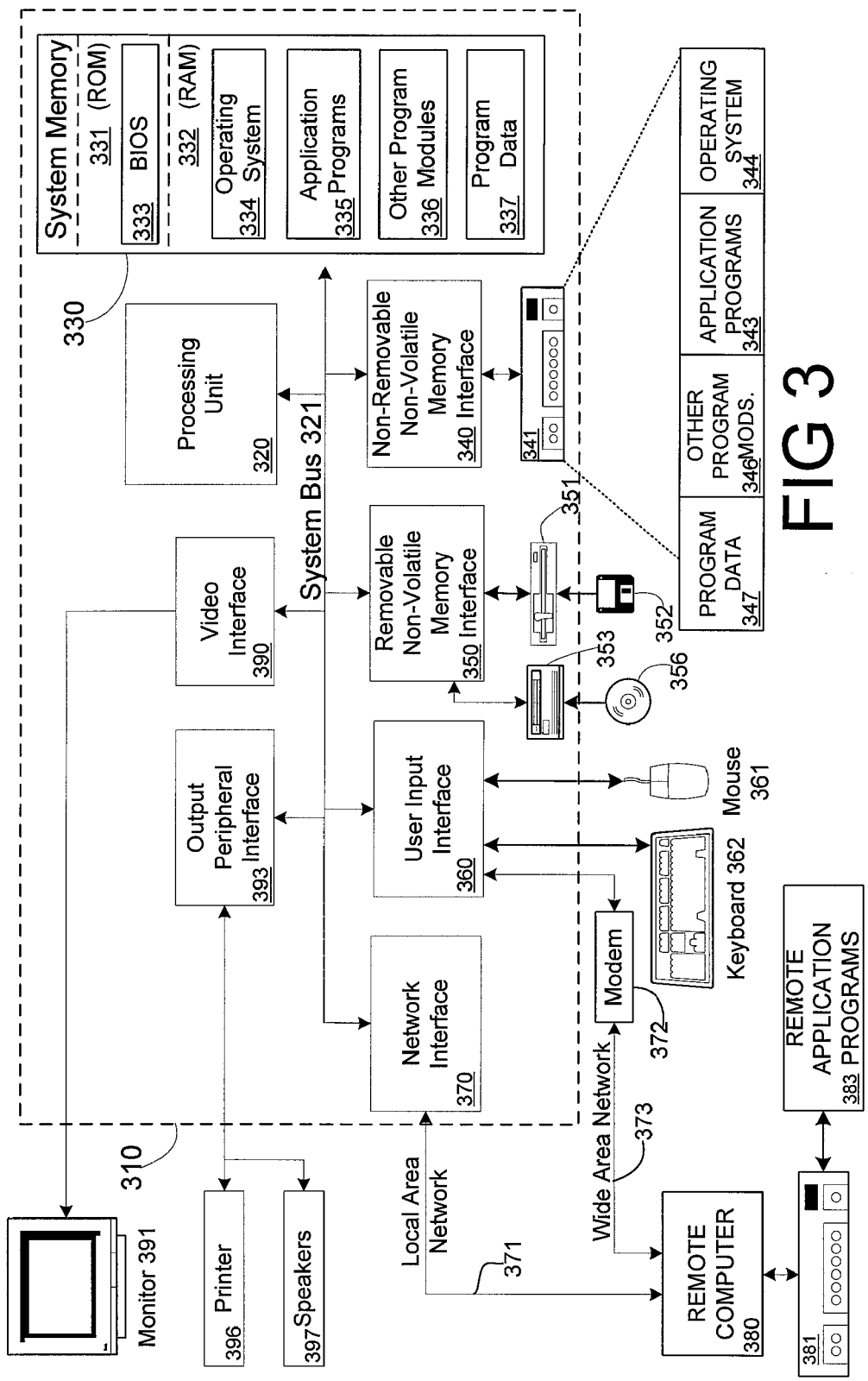

BARE METAL RECOVERY FROM BACKUP MEDIA TO VIRTUAL MACHINE

BACKGROUND

Bare metal recovery is the process of re-building a machine when the machine fails due to catastrophic failure of the boot disk. Typically, the failed disk is replaced and then special recovery software is run that allows the image of the original disk to be copied from a backup image to the new hard drive and the system is restored. The recovery software must boot and be able to access the new hard drive as well as access the backup image. This means that the recovery software must have appropriate drivers for a large variety of hardware. In some cases the system being recovered may be obsolete and it may be difficult to build a bootable image. In other cases the process of repairing the hardware may require the replacement of components for which the drivers in the backup image may not be correct.

SUMMARY

A legacy computer system receives a hard drive or other hardware failure. Rather than attempting to rebuild the computer system or recover selected data, which may require locating discontinued hardware or even software, a virtual machine image is created from a previously prepared backup image of the hard drive. The retrieved backup image is modified to create a virtual image that is bootable on a virtual machine. Thus, the original computer environment stored on the legacy system is now virtualized removing the need to repair or replace the failed hardware.

In another embodiment, a user may wish to retire one or more computer systems. However, it may be desirable that data on the computer systems be available to the user along with the original environment that the desired data was executed in. Accordingly, before the computer system is retired a virtual machine image is created from the hard drive. Once the virtual image is created the retired system is virtualized and will now be available to users regardless of the fate of the retired system.

BRIEF DESCRIPTION OF THE DRAWINGS

FIG. 1 is an illustration of an exemplary method for virtualizing a damaged legacy system;

FIG. 2 is an illustration of an exemplary method for virtualizing one or more retired legacy systems; and FIG. 3 is a block diagram of an example computing environment in which example embodiments and aspects may be implemented.

DETAILED DESCRIPTION

FIG. 1 is a illustration of an exemplary method for virtualizing a damaged legacy system. At 104, a system is selected for virtualization. In one embodiment the system has received a hard drive failure making the system inoperable. In another embodiment, some other piece of hardware is damaged, such as a video card, for example. Those of ordinary skill in the art will appreciate that typical computer systems are susceptible to a wide variety of hardware failures.

At 107, a backup image file associated with a damaged or non-functional system is retrieved. In one embodiment, the backup image may have been previously created to allow for a system restore in the case of a hard drive failure. In another embodiment, the hard drive is removed from the damaged system and an image is created. Those of ordinary skill in the art will appreciate that there are a number of commercially available software packages for creating a backup image of a hard drive for a later system restore operation. Any system, method, or technique for making a backup image known in the art may be used.

At 109, the backup image is converted to a virtual hard drive image. The virtual hard drive image is a virtualization of the original computer system that can be executed by a virtual machine allowing the original computer environment to be recreated on a computer running the virtual machine. The virtual hard drive image can be created in accordance with the methods described in U.S. patent application Ser. No. 11/430,676, titled "CONVERTING PHYSICAL MACHINES TO VIRTUAL MACHINES", the contents of which are hereby incorporated in their entirety.

At 111, the generated virtual machine image may be stored or otherwise catalogued and the damaged legacy computer system can be discarded. By virtualizing the damaged legacy computer system, the system can be operated on a virtual machine executing on more modern hardware. Legacy systems can contain parts that are no longer supported or available, but still may contain valuable data or specific versions of applications that are desirable but no longer available for current generation systems. Thus, virtualizing the damaged system ensures that virtualizations of the physical system will be available to future users without the expenses associated with maintaining legacy systems.

FIG. 2 is an exemplary method for retiring one or more legacy systems. At 205, one or more systems are selected for retirement. For example, a corporation may desire to replace one or more legacy computers. The legacy computers may contain data that the corporation may wish to retain. One solution is to transfer the desired data from the legacy system to the new systems. However, legacy systems often include applications or versions of applications that may not be available for the new system, or may be unavailable in the future when someone desires to access the data. Thus, it is desirable to virtualize the legacy systems rather than migrate desired data to more modern computers.

At 210, backup images associated with the legacy system are retrieved. As part of a data retention policy, back up images of the computer system may be routinely created. In one embodiment, preexisting backup images are retrieved. In another embodiment, each legacy system has a backup image created. Any system, method, or technique for creating a backup image can be used.

At 215, the backup images may be converted into virtual hard drive images. The images may converted according to the methods described in U.S. patent application Ser. No. 11/430,676, titled "CONVERTING PHYSICAL MACHINES TO VIRTUAL MACHINES." However, any other methods for converting images into virtual machine hard drive images known in the art may be used.

At 235, the virtual hard drive images are stored in a virtual machine server or other storage device such that the images are available for use as virtual machines.

Exemplary Computing Arrangement

FIG. 3 shows an exemplary computing environment in which example embodiments and aspects may be implemented. The computing system environment 300 is only one example of a suitable computing environment and is not intended to suggest any limitation as to the scope of use or functionality. Neither should the computing environment 300 be interpreted as having any dependency or requirement relating to any one or combination of components illustrated in the exemplary operating environment 300.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 3, an exemplary system includes a general purpose computing device in the form of a computer 310. Components of computer 310 may include, but are not limited to, a processing unit 320, a system memory 330, and a system bus 321 that couples various system components including the system memory to the processing unit 320. The processing unit 320 may represent multiple logical processing units such as those supported on a multi-threaded processor. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 321 may also be implemented as a point-to-point connection, switching fabric, or the like, among the communicating devices.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for recovering one or more selected computer systems, comprising:
    retrieving one or more backup images corresponding to the one or more selected computer systems;
    converting the backup images to a virtual hard drive image; and
    storing the converted virtual hard drive image in a catalog of virtual hard drive images corresponding to damaged and/or obsolete computer systems.

2. The method of claim 1, wherein the virtual hard drive image is stored in a virtual hard drive image server.

3. The method of claim 1, further comprising discarding the selected computer systems.

4. The method of claim 1, wherein at least one of the selected computer systems is damaged.

5. The method of claim 1, further comprising executing the virtual hard drive image on a virtual machine.

6. A computer-readable storage medium with computer-executable instructions stored thereon for performing the method of:
    retrieving one or more backup images corresponding to one or more selected computer systems;
    converting the backup images to a virtual hard drive image; and
    storing the converted virtual hard drive image in a catalog of virtual hard drive images corresponding to damaged and/or obsolete computer systems.

7. The computer-readable storage medium of claim 6, wherein the virtual hard drive image is stored in a virtual hard drive image server.

8. The computer-readable storage medium of claim 6, further comprising discarding the selected computer systems.

9. The computer-readable storage medium of claim 6, wherein at least one of the selected computer systems is damaged.

10. The computer-readable storage medium of claim 6, further comprising executing the virtual hard drive image on a virtual machine.

11. A system for recovering one or more selected computer systems, comprising:
    a computer processor adapted to:
        retrieve one or more backup images corresponding to the one or more selected computer systems;
        convert the backup images to a virtual hard drive image; and
        store the converted virtual hard drive image in a catalog of virtual hard drive images corresponding to damaged and/or obsolete computer systems
    a storage device adapted to store the catalog of virtual hard drive images.

12. The system of claim 11, wherein the storage device is a virtual hard drive image server.

13. The system of claim 11, wherein at least one of the selected computer systems is damaged.

14. The system of claim 11, wherein the computer processor is further adapted to execute the virtual hard drive image on a virtual machine.

* * * * *